Feb. 10, 1942.   S. C. WINGER ET AL   2,272,495
POWER TRANSMITTING SYSTEM
Filed June 4, 1938   4 Sheets-Sheet 1
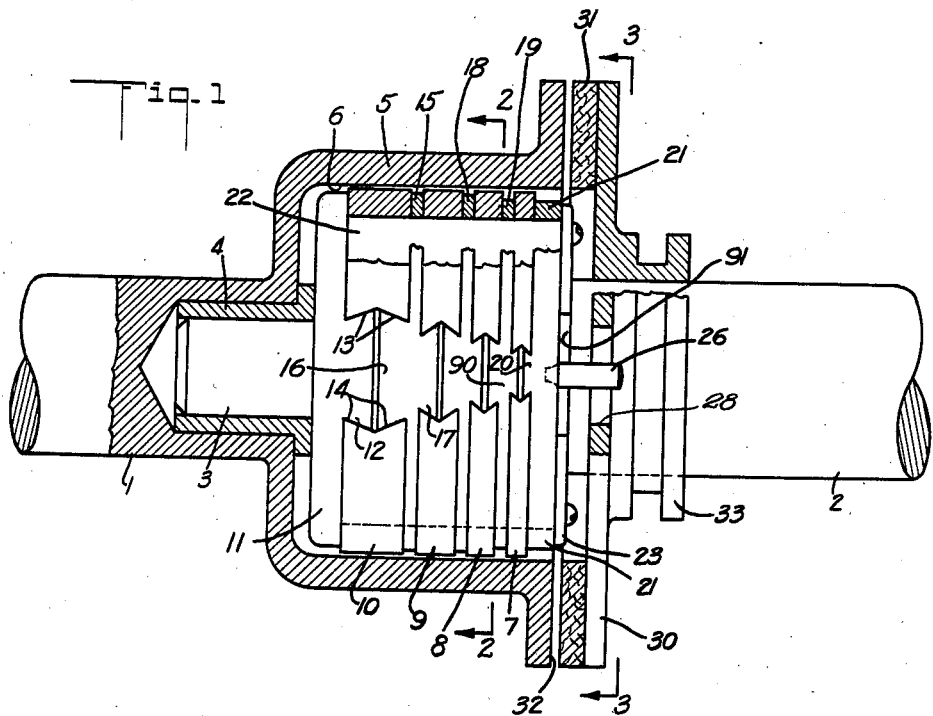
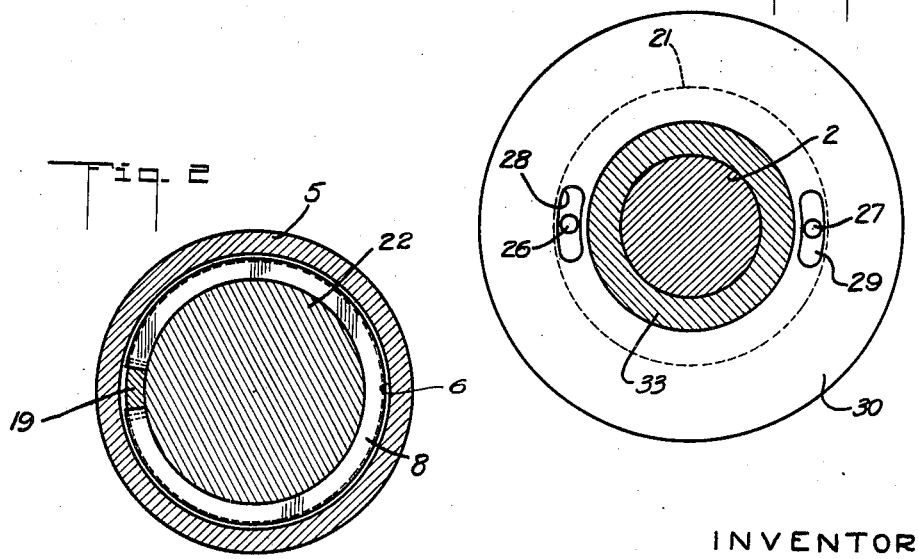
INVENTORS
Stover C. Winger
Leslie K. Loehr
BY John Flam
ATTORNEY Feb. 10, 1942.   S. C. WINGER ET AL   2,272,495
POWER TRANSMITTING SYSTEM
Filed June 4, 1938   4 Sheets-Sheet 2

INVENTORS
Stover C. Winger
Leslie K. Loehr
BY John Flam
ATTORNEY

Feb. 10, 1942. S. C. WINGER ET AL 2,272,495
POWER TRANSMITTING SYSTEM
Filed June 4, 1938 4 Sheets-Sheet 3
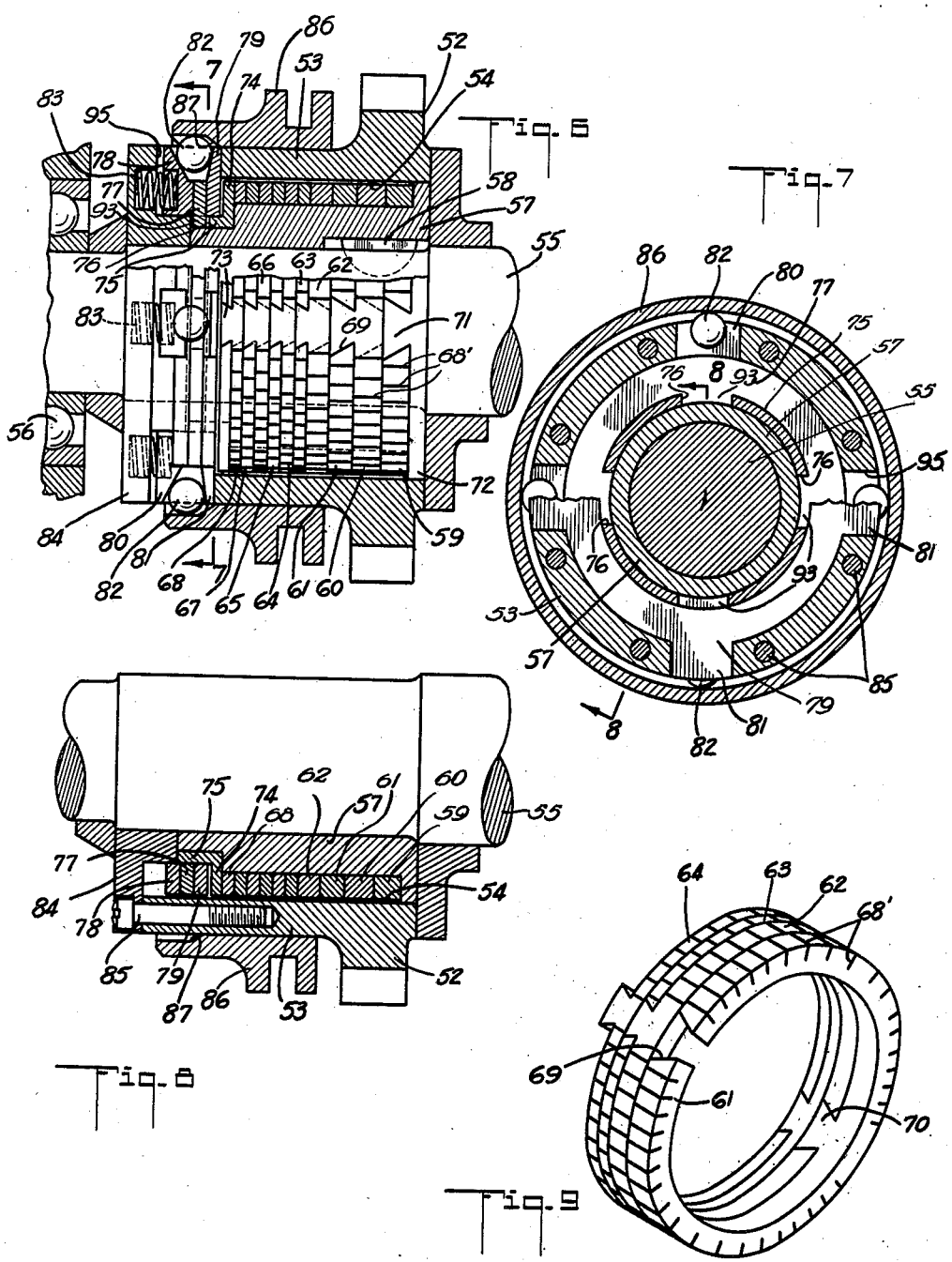
INVENTORS
Stover C. Winger
Leslie K. Loehr
BY John Hans
ATTORNEY

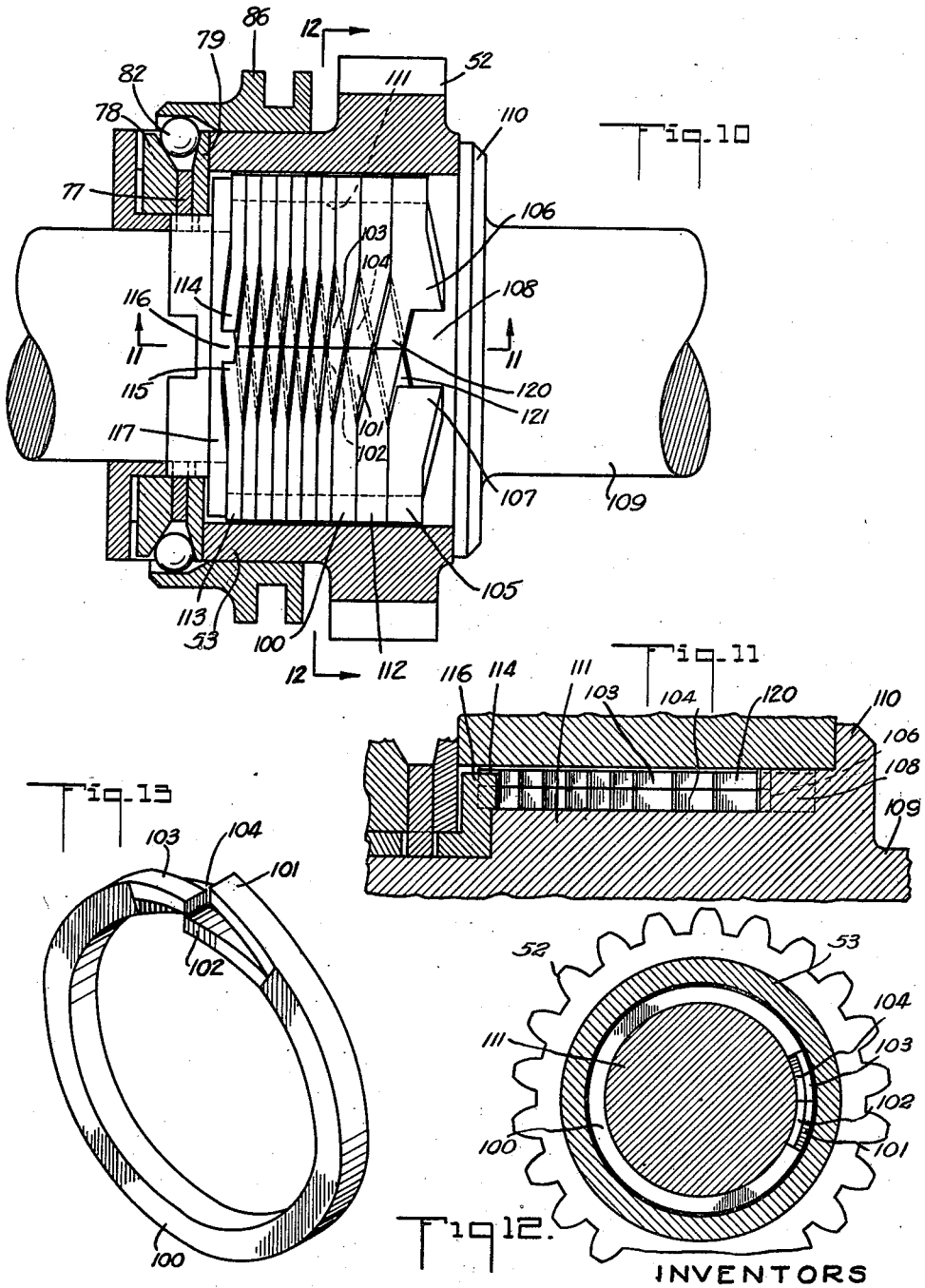

Patented Feb. 10, 1942

2,272,495

UNITED STATES PATENT OFFICE 2,272,495

POWER TRANSMITTING SYSTEM

Stover C. Winger and Leslie K. Loehr, Los Angeles, Calif., assignors to Guy H. Hall, Los Angeles, Calif.

Application June 4, 1938, Serial No. 211,864

9 Claims. (Cl. 192—35)

This invention relates to the transmission of power through a controllable clutch means.

Clutches of this general character are exemplified by devices incorporated in almost all types of motor vehicles. Such motor vehicles (whether they be land, air, or marine vehicles) are so operated that clutching and declutching occur at frequent intervals. In order to discuss the problems ordinarily appurtenant to such operations, an automotive land vehicle may be chosen as a concrete example of a power driven unit utilizing a clutching mechanism.

A type of clutch adapted to perform the operation of connecting and disconnecting a source of power and a load, utilizes a helix. If a cylindrical clutching surface is placed within the helix, a winding up of the helix causes a corresponding reduction in inside diameter thereof, and the cylindrical surface is gripped. Accordingly if one end of the helix be joined to an engine shaft, and the driven shaft is provided with a cylindrical surface placed within the helix, clutching can be accomplished by winding up the free end of the helix. This winding up action, however, automatically proceeds to extend to all of the turns, the winding taking place by virtue of the frictional traction between the turns and the cylindrical surface. Eventually the winding process stops because of the great friction encountered, and the clutch is in full driving position.

It is one of the objects of this invention to provide an improved clutch mechanism that operates on principles similar to the helical clutch just discussed.

In such clutches as heretofore used, the transfer of power can be accomplished only for a definite direction of rotation; for opposite rotation the clutch is ineffective. Also, when the driven member for some reason has imparted to it through some other agency, a speed that is in excess of that of the driving member (as for example, when a car is coasting downhill), then the clutch is again ineffective. It is another object of this invention to make it possible to maintain the "wrap-around" type of clutch in effective clutching relation irrespective of the change in direction of rotation, or of a change of direction of power transfer.

The helical type of clutch has the advantage of being engageable gradually, so that the driven member is gradually brought to the same speed as the driving member. In this clutching period, there is a frictional slip, which generates some heat. It is another object of this invention to make it possible readily to radiate or dissipate this generated heat. This is accomplished by utilizing a clutching cylindrical surface into which the other element of the clutch expands, and the external surface of the cylindrical clutching member serves effectively as a heat radiating surface.

As the wrapping around action takes place, it can be demonstrated that the gripping force increases at a rate out of all proportion to the angular extent of the turns in contact with the cylindrical clutching surface. The last turns thus are urged into contact with the cylindrical surface by a force corresponding to the integration of the frictional forces acting on the previous turns.

In order that the gripping pressures per unit of area remain substantially uniform throughout the entire length of the coils, the width of the turns may be gradually increased as the turns advance from the free end. It is accordingly another object of this invention to make it possible by this means to reduce materially any inequality in the pressures exerted between the coils and the cylindrical surface.

This invention possesses many other advantages, and has other objects which may be made more easily apparent from a consideration of several embodiments of the invention. For this purpose there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

Figure 1 is a view, mainly in longitudinal section, of one embodiment of the invention;

Fig. 2 is a sectional view taken along plane 2—2 of Fig. 1;

Fig. 3 is a sectional view taken along plane 3—3 of Fig. 1;

Fig. 6 is a view similar to Fig. 1 of still another form of the invention;

Fig. 7 is a sectional view taken along plane 7—7 of Fig. 6;

Fig. 8 is a sectional view taken along plane 8—8 of Fig. 7;

Fig. 9 is a pictorial view showing the manner in which the series of clutching bands may be arranged;

Fig. 10 is a view similar to Fig. 6, of a still further modification;

Figure 4:
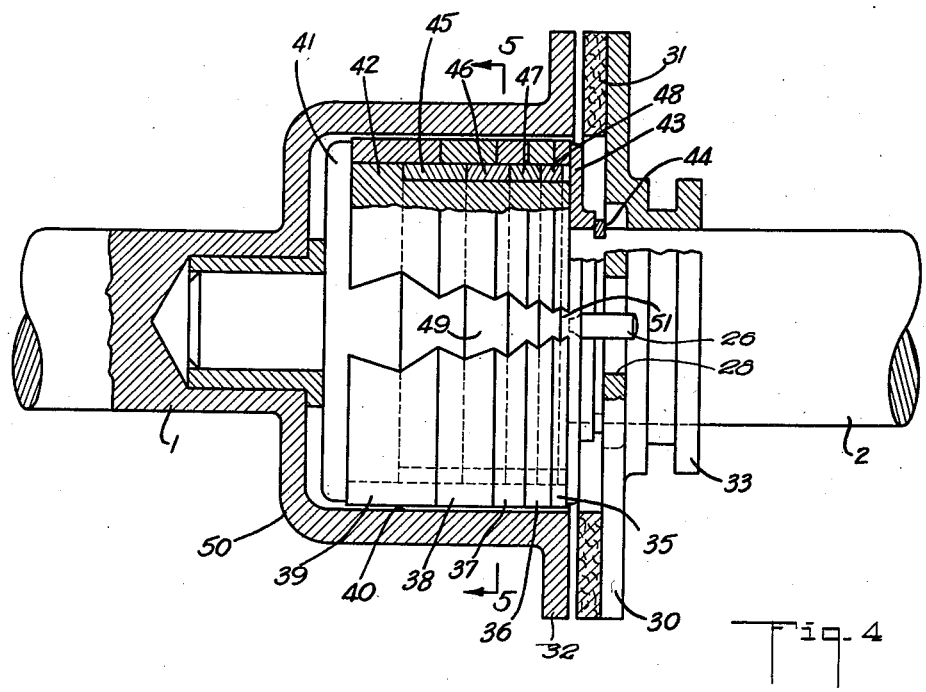
Fig. 4 is a view similar to Fig. 1 of a modified form of the invention.

Figs. 11 and 12 are sectional views, taken respectively along planes 11—11 and 12—12 of Fig. 10; and Fig. 13 is a pictorial view of a clutching band used in the form shown in Fig. 10.

In the form of the invention illustrated in Figs. 1, 2 and 3, the two shafts 1 and 2, which are intended to be coupled by the clutching mechanism, are shown as coaxially arranged. It may be assumed, although this is not essential, that shaft 1 is the driving shaft and that shaft 2 is the driven shaft.

As a convenient means for supporting one end of shaft 2, it is shown as provided with an extension 3 journaled within the journal bearing 4, disposed in an appropriate aperture in the end of shaft 1.

The clutching members are so arranged that one member surrounds the other, and by radial movement of one of them toward the other, the two members may be brought into clutching engagement. Thus for example, shaft 1 carries a cup-like member 5 providing an interior cylindrical clutching surface 6. Adapted to cooperate with this clutching surface is a series of expansible split bands 7, 8, 9 and 10. These bands are arranged in such manner as to form virtually a continuous series of convolutions, similar to a helix. They are intended to be expanded radially so as to contact the cylindrical surface 6 and thereby to cause a driving force to be exerted upon the shaft 2, since one end of the series of bands is operatively connected to the shaft. This expansion is caused to take place by operation of control mechanism associated with shaft 2.

Shaft 2 carries the enlarged portion 22 upon which the bands 7, 8, 9 and 10 are disposed. The left hand end of the enlarged portion 22 carries an integral flange 11 keyed to the end band 10, as by a dovetail key 12. This key extends radially into the split or gap formed in the end band 10. This split or gap is shown in the present instance as defined by the sloping surfaces 13 and 14. The next band 9 is joined to the band 10 by the aid of an intermediate keying ring 15, also disposed on an enlarged portion 22. This keying ring has a pair of oppositely directed keys 16 and 17, respectively engaging in the gap in bands 10 and 9. Similarly, keying ring 18 serves to join the bands 9 and 8; and keying ring 19 serves to join the bands 8 and 7. The end band 7 is keyed as by key 20 to a control ring 21 that is free to rotate on the enlarged portion 22 of the shaft 2.

The series of rings and bands may be restrained against axial displacement, between the flange 11 and a flange 23 fastened to the right hand surface of the enlarged portion 22 on the shaft 2.

The series of expanding bands 7, 8, 9 and 10, by virtue of the connecting rings 15, 18 and 19, form a helical-like structure corresponding in some respects to the helical clutch devices formed by the aid of a helically convoluted spring wire. One end of the structure is anchored to shaft 2 by key 12. The bands 7, 8, 9 and 10 are preferably made of resilient material so that they may be readily expanded into contact with surface 6. An important result of this arrangement is that rotation of control ring 21 in either direction relative to shaft 2, will cause the helical-like structure formed by bands 7, 8, 9, 10 and rings 15, 18, 19 to expand. This effect is due to the provision of the key 20 inserted in the split in the end band 7.

When band 7 is thus expanded, to engage surface 6, a frictional drag on this band by surface 6 exerts a corresponding expanding force in succession on the bands 8, 9 and 10 through the intervening keying rings.

This frictional drag, imposed by rotation of the member 5, transmits a force through band 7, thence via key 90 and ring 19, to the next band 8. When so expanded, the split or gap in the bands widens; but this is not indicated because in the drawings the bands are intended to be shown in the normal unexpanded condition.

Shortly after band 7 is thus expanded into contact with surface 6, the bands 8, 9 and 10 are successively placed in clutching contact with this surface. The frictional forces imposed by the clutching contact on the bands are such as to cause all of the bands to remain expanded and in driving relation with all of the bands, so long as the end band 7 is maintained in expanded condition. Accordingly, since the end band 10 is keyed to the shaft structure 2, this shaft is driven through the clutching mechanism.

The width of the bands from right to left increases, the band 10 being the widest and the band 7 the narrowest. This is of importance, for the reason that the cumulated or integrated frictional forces available on the band 10, which is joined to the shaft 2, become quite great, and by widening this ring, the pressure per unit of area is maintained at a suitable value.

Furthermore, the keys 12, 16, 17, 20 and 90, as well as the key on ring 18, have sloping sides to form dovetails. The dovetailing effect assists in insuring against appreciable cocking of the bands as they are expanded.

The manner in which the control ring 21 may be rotated so as to initiate the clutching action, may be made clear by the aid of Figs. 1 and 3. For this purpose the control ring 21 is provided with a pair of pins 26, 27. Flange 23 is cut away as indicated at 91, to permit the passage of these pins. These pins are intended to be disposed in arcuate slots 28 and 29 formed in a pilot clutch disc 30. This pilot clutch disc may be provided with a clutch facing 31 adapted to cooperate with a corresponding clutch face 32 on the cylindrical cup 5. The control clutch disc 30 is adapted to be moved into or out of engagement with the clutch face 32 as by the aid of a grooved clutch collar 33. The shaft 2 is freely rotatable relative to the collar 33.

Now if it be assumed that the pilot clutch disc 30 be moved toward the left against the moving clutch face 32, the clutch disc 30 will be rotated; and after a while the pins 26 and 27 will come in contact with the ends of the slots 28 and 29 and the control ring 21 will be rotated to expand band 7. It is also clear that the direction of rotation is immaterial, the same action taking place whether the key 20 is moved upwardly or downwardly, as viewed in Fig. 1. The expansion of the helical-like element nevertheless occurs. Since disc 30 is kept in driving contact with face 32, even after shaft 2 comes up to the same speed as shaft 1, any incipient tendency to permit control ring 21 to move band 7 out of clutching contact would be immediately overcome by the drag on disc 32 just as soon as shaft 2 begins to slow down.

The operation of the pilot clutch collar 33 may be accomplished in any desired manner. It might be manual or automatic, in response to any of a number of conditions of operation.

Due to the fact that the clutch bands 7, 8, 9 and 10 expand into the cup 5, the exterior surface of cup 5 can readily dissipate whatever heat is generated by friction between the clutching surfaces. At any rate, this friction occurs only during the operation of causing all of the bands to engage or disengage.

It has been assumed so far that shaft 2 is the driven shaft. The same action, however, takes place even when shaft 1 is the driven shaft. Under such circumstances, engagement of disc 30 (which is now the driving disc), with the stationary flange 32, causes disc 30 to be frictionally restrained. There is thus a relative angular motion between shaft 2 and disc 30, sufficient to cause operation of control ring 21 and expansion of band 7.

In order to disengage the drive, the pilot clutch disc 30 is moved to the right to the position indicated. When this occurs, there is no longer any force tending to keep the end band 7 in contact with the surface 6. The bands 7, 8, 9 and 10 then in succession return to the retracted position of Fig. 1, and the clutch is disconnected.

Figure 5:
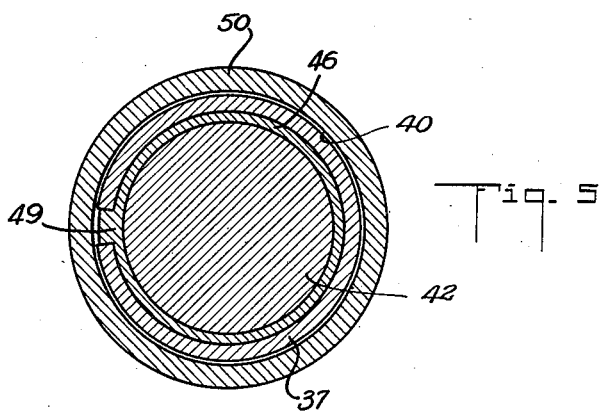
Fig. 5 is a sectional view taken along plane 5—5 of Fig. 4.

In the form of the invention illustrated in Figs. 4 and 5, the shafts 1 and 2 are arranged substantially as before. In this case the expanding bands 35, 36, 37, 38, 39 are arranged substantially as in the first form described, to cooperate with the clutching cylindrical surface 40 of the cup 50. These bands are shown as being confined against relative axial movement by the aid of the integral flange 41 carried by the enlarged portion 42 of the shaft 2; and by the ring 43 at the right hand end of the series of bands. This ring 43 is shown as restrained against movement toward the right by a spring ring 44 extending into an annular groove formed in the shaft 2. The pilot clutch disc 30 and the pilot clutch collar 33 are arranged substantially as before.

In this instance the keying rings 45, 46, 47 and 48 which connect adjacent bands, are located within these bands, and are respectively overlapped by the adjacent bands. The keying rings carry radial keys, such as 49, which engage within the gaps in both of the adjacent bands. The cup 50 joined to the driving shaft 1 is adapted to cooperate with the pilot clutch disc facing 31 in order to operate the ring 43, which acts in this instance also as the control ring. This ring 43 is keyed, as by key 51, into the gap of the end band 35. The mode of operation is substantially identical as in the first form described.

In the form of the invention illustrated in Figs. 6, 7, 8 and 9, the pinion 52 is shown as one of the members to be coupled. This pinion 52 is provided with an elongated hub 53 forming an interior cylindrical clutching surface 54.

The other member to be coupled is shown as a shaft 55 extending through the hub 53 and supported at its left hand end by a ball bearing structure 56. The shaft 55 carries a band supporting sleeve 57. This sleeve 57 is joined to the shaft 55 as by a key 58. Interposed between the sleeve 57 and the clutching surface 54 is a series of expandable split bands 59 to 68 inclusive. The manner in which these bands are joined together so as to expand, irrespective of the direction of the imposed frictional torques, is best illustrated in Fig. 9. This figure illustrates the bands 61, 62, 63 and 64. Each of these bands may be provided with a number of radial cuts or slots, such as 68', to lend greater resilience to the bands. Each band has a split 69 defined by sloping walls into which is adapted to fit a corresponding dovetailing key extending laterally from the adjacent band. In this manner each band, such as 61, has a gap, such as 69. Each band also carries a key, such as key 70, which fits into the corresponding gap in the adjacent band. Although not essential, the key and the split on each band are angularly spaced about 180 degrees from each other. Thus the gaps, such as 69, occur alternately on opposite sides of the shaft 55.

The widest band 59 is shown as keyed by the aid of key 71, to the flange 72 of the sleeve 57. The narrowest band 68 has a key 73 extending into a corresponding slot in the control ring 74. This control ring 74 has a hub 75 freely rotatable upon a reduced portion of the sleeve 57. The hub in turn is provided with a series of slots 76 for providing a driving connection to a pilot clutch disc 77, which for this purpose has inwardly extending projections 93 entering slots 76.

When this pilot clutch disc 77 is rotated by a cooperating clutching disc in one or the other direction relatively to shaft 55, the control ring 74 is correspondingly rotated, and the end band 68 is expanded into contact with the clutching surface 54. Thereafter the operation is similar to that described in connection with the other forms of the invention.

As ring 74, rotated by clutch disc 77, moves the key 73 on band 68, that portion of the band is expanded between key 73 and the split in the band. The frictional drag imposed on band 68 when a portion of it is thus urged into contact with the surface 54, causes a portion of the adjacent band 67 also to expand. In this way, a portion of the exterior surfaces of each of the bands 59 to 68 is placed in operative contact with the clutching surface 54 and the pinion 52 is thereby driven.

The manner in which the pilot clutch disc 77 is operated upon relative angular rotation between the pinion 52 and shaft 55 will now be described. Thus on each side of the clutch disc 77 are a pair of cooperating clutch discs 78 and 79. Both of these clutch discs are provided with radial extensions, such as 80 and 81, engaging in slots 95 in the end of hub 53 of pinion 52, so as to be in driving relation therewith. These projections 80 and 81 are provided with sloping faces for the accommodation of balls 82. A series of compression springs 83, acting on disc 78, serves to urge the clutch discs together. The left hand end of these compression springs is accommodated in a collar 84, also rotatable with the hub 53, as for example by being fastened to the hub 53 by the aid of a series of screws 85 (Fig. 8).

Normally, the pilot clutch discs 77, 78 and 79 are in engagement as indicated in Fig. 6, being urged into that position by the compression springs 83. However, there is provided a control pilot clutch collar 86 slidable over the hub 53. This clutch collar is provided with a sloping annular shoulder 87 adapted to contact the balls 82 when moved toward the left, and to separate the disc 78 from the disc 77. As before, the clutch control collar 86 may be operated manually or in any other desired manner.

The mode of operation of this form of the invention is substantially the same as that described in connection with the other form. When shaft 55 is rotated and the pilot clutch is disconnected, there is no expansion of the clutch bands 59 to 68 inclusive. However, as soon as the pilot clutch is allowed to engage, a restraint is placed upon the end band 68 by this pilot clutch, with the result that at least a portion of this band expands into contact with the surface 54. Thereafter the subsequent bands in the series are expanded to increase the frictional area of contact. Finally, all of the bands are in driving relation, and as long as the pilot clutch remains in engagement, the bands stay in the expanded position. Just as soon as the clutch is released, however, the reverse process takes place; the end band 68 is permitted to contract and the other bands follow in succession.

In this form of the invention it is seen that no keying rings are needed to impress expanding forces from one band to the next adjacent band. Instead, a portion of each of the bands is used for this purpose, corresponding to the split, such as 69, and the key 70.

In the form of the invention illustrated in Figs. 10, 11, 12, and 13, the expanding bands are also formed in such a manner that no intervening keying rings are required. The form of these expanding bands is best illustrated in Fig. 13, which shows a typical band 100 intermediate the end bands. The band 100 is split at the ends. These ends are forked, forming the four forks 101, 102, 103, and 104. These forks, at each end, extend in opposite directions respectively, and the opposing forks, such as 102 and 103, are radially displaced.

By placing the bands adjacent each other, as illustrated in Fig. 10, all those forks 101 and 103, corresponding to the radially outwardly placed forks, cooperate with each other to transmit thrusts from one band to the next. Similarly, these forks 102 and 104, corresponding to the radially inwardly placed forks, cooperate with each other to transmit thrusts in the opposite directions. Thus forks 101, 103, etc., which are spaced radially outwardly with respect to the other forks, are in effect connecting keys to form a helical-like structure in combination with the bands, to transmit a thrust in one direction through the bands. Similarly, the forks 102, 104, etc., which are radially spaced inwardly, are connecting keys to form a similar helical-like structure to transmit thrusts from one band to the other in the opposite direction. In this way, it is immaterial what the direction of relative motion may be between the driving and driven elements.

The end bands are respectively keyed to one of the elements that is driven or driving, and to a control ring for expanding the bands. Thus in Fig. 10 the end band 105 is shown as having its spaced ends 106 and 107 engaged by a key 108 integral with the shaft structure 109. This shaft structure, as before, may be either the driving or driven element. The shaft structure 109 is shown as also having the integrally formed flange 110 and an enlarged portion 111 upon which the expanding bands, such as 100, are placed.

The opposing forks 106 and 107 of the end band 105 are spaced apart and have a radial depth, when they engage key 108, corresponding to the radial depth of the ring 105, because these opposing forks merely provide a key space for the accommodation of the key 108. However, the opposing forks 120 and 121 are at different radii so as to provide appropriate abutments respectively for the correspondingly radially displaced forks on the next adjacent ring 112.

Similarly, the other end ring 113 also has its opposing forks 114 and 115 spaced apart and of the same radial depth as the depth of the band, in order to provide a space for the key 116. This key 116 is formed on the control ring 117, which is otherwise similar in construction to the control ring 74 of Fig. 6. This control ring 117, as before, may be controlled by the aid of a clutch mechanism including the clutch discs 77, 78 and 79, springs 83, and the balls 82.

Relative rotation of the control ring 117 in either direction will cause an expansion of all of the bands. If the relative rotation is such that the key 116 is moved upwardly, as viewed in Fig. 10, the outer forks 101, 103, etc., are active to transmit the thrust from one band to the next. On the other hand, should the relative rotation be such as to cause the control ring 117 to move downwardly, as viewed in Fig. 10, the inner forks 102, 104, etc., form the thrust transmitting elements. In either case, however, the entire angular extent of the bands is effective for expansion.

What is claimed is:

1. In a clutch mechanism, a rotary member having an interior cylindrical surface, a series of bands, arranged coaxially of the surface, each of said bands being split, the ends of the band being spaced apart to form a gap, and each band also having a key, angularly spaced by a substantial portion of the circumference from the split, and adapted to engage in the gap of the adjacent band, a rotary member keyed into the gap of an end band, and means engaging the key of the other end band, for expanding said other end band into contact with said surface.

2. In a clutch mechanism, a rotary member having an interior cylindrical surface, a series of bands, arranged coaxially of the surface, each of said bands being split, the ends of the band being spaced apart to form a gap, and each band also having a key, angularly spaced from the split, and adapted to engage in the gap of the adjacent band, a rotary member keyed into the gap of an end band, and a pilot clutch structure, including a disc operatively engaging the other end band, a disc keyed to the first mentioned rotary member, and spring means for urging said discs toward each other.

3. In a device of the character described, a series of discontinuous bands having opposed ends forming a gap, said bands having external cylindrical surfaces and extending along a common axis, means forming an internal cylindrical surface for cooperation with said external surfaces, and means forming force exerting couplings respectively between adjacent bands, including, for each such coupling, a projection on a band entering into the gap of one of the adjacent bands, said projection being angularly spaced from the gap in the band which carries the projection, by a substantial portion of the circumference.

4. In a device of the character described, a series of discontinuous bands having opposed ends forming a gap, said bands having external cylindrical surfaces and extending along a common axis, means forming an internal cylindrical surface for cooperation with said external surfaces, and means forming force exerting couplings respectively between adjacent bands, comprising for each coupling, a projection carried by one of the adjacent bands and entering into the gap of the other of said adjacent bands, said projection being angularly spaced from the gap in said one of the adjacent bands by a substantial portion of the circumference.

5. In a device of the character described, a series of discontinuous bands having opposed ends forming a gap, said bands having external cylindrical surfaces and extending along a common axis, means forming an internal cylindrical surface for cooperation with said external surfaces, means forming force exerting couplings respectively between adjacent bands, including, for each such coupling, a projection entering into a gap of one of the adjacent bands, said projection being angularly spaced from the gap in the band which carries the projection, by a substantial portion of the circumference, and means, including a projection entering into the gap of the end band, for urging said band into clutching contact with said internal cylindrical surface.

6. In a device of the character described, a series of discontinuous bands having opposed ends forming a gap, said bands having external cylindrical surfaces and extending along a common axis, means forming an internal cylindrical surface for cooperation with said external surfaces, and means forming force exerting couplings respectively between adjacent bands, said couplings including means carried by each band adapted to cooperate with the gap of the next adjacent band, said means being so spaced with relation to the gap of the respective supporting band that a substantial portion of the circumferential extent of said band lies on each side of said means, whereby the exertion of a torque in either direction by a band operates through a substantial angle of the next adjacent band to the second adjacent band.

7. In a device of the character described, a series of circular segmental bands extending along a common axis, keys carried respectively by the bands, each key being adapted to engage the succeeding band, the point of engagement of one band and the next band being diametrically opposite the point of engagement of said next band and the succeeding band, for the transmission of torque in either direction of rotation, and means including an internal cylindrical surface for cooperation with the external surface of said circular segmental bands.

8. In a mechanism of the character described, means forming an internal cylindrical surface, and a plurality of interconnected open ended bands, the bands each having a key, there being a gap between the open ends, said plurality of bands having exterior surfaces adapted to cooperate with and engage the internal cylindrical surface, adjacent bands being joined by a key extending from one band into the gap of the other band, the key of each band having a relatively short angular extent and being intermediate the ends of its supporting band.

9. In a mechanism of the character described, means forming an internal cylindrical surface, and a plurality of interconnected open ended bands, the bands each having a key, there being a gap between the open ends, said plurality of bands having exterior surfaces adapted to cooperate with and engage the internal cylindrical surface, adjacent bands being joined by a key extending from one band into the gap of the other band, the key of each band having a relatively short angular extent and being equidistant from the ends of its supporting band.

STOVER C. WINGER.
LESLIE K. LOEHR.